US009349111B1

(12) United States Patent
Elgarat

(10) Patent No.: US 9,349,111 B1
(45) Date of Patent: May 24, 2016

(54) SYSTEM, METHOD, AND COMPUTER PROGRAM FOR CALCULATING RISK ASSOCIATED WITH A SOFTWARE TESTING PROJECT

(71) Applicant: Amdocs Software Systems Limited, Dublin (IE)

(72) Inventor: Sharon Elgarat, Kibbutz Mefalsim (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/550,864

(22) Filed: Nov. 21, 2014

(51) Int. Cl.
*G06F 9/44* (2006.01)
*G06Q 10/06* (2012.01)
*G06F 11/36* (2006.01)

(52) U.S. Cl.
CPC ............ *G06Q 10/0635* (2013.01); *G06F 11/36* (2013.01)

(58) Field of Classification Search
CPC ...................................................... G06F 11/36
USPC ......................................................... 717/124
See application file for complete search history.

(56) References Cited

U.S. PATENT DOCUMENTS

| 5,655,074 | A | 8/1997 | Rauscher |
| 6,219,805 | B1 | 4/2001 | Jones et al. |
| 6,546,493 | B1 | 4/2003 | Magdych et al. |
| 6,895,383 | B2 * | 5/2005 | Heinrich ...................... 705/7.28 |
| 2002/0052862 | A1 * | 5/2002 | Scott et al. ......................... 707/1 |
| 2004/0015375 | A1 * | 1/2004 | Cogliandro ........................ 705/7 |
| 2004/0093224 | A1 * | 5/2004 | Vanska et al. ..................... 705/1 |
| 2007/0033445 | A1 * | 2/2007 | Hirsave et al. .................. 714/47 |
| 2011/0067005 | A1 * | 3/2011 | Bassin et al. ................... 717/127 |

OTHER PUBLICATIONS

U.S. Appl. No. 14/550,869, filed Nov. 21, 2014.
U.S. Appl. No. 14/281,795, filed May 19, 2014.

* cited by examiner

*Primary Examiner* — Wei Zhen
*Assistant Examiner* — Lanny Ung
(74) *Attorney, Agent, or Firm* — Zilka-Kotab, PC

(57) ABSTRACT

A system, method, and computer program product are provided for calculating risk associated with a software testing project. In use, a plurality of inputs associated with at least one software testing project are received. Additionally, risk elements are identified utilizing the plurality of inputs. Further, a weight is assigned to each of the identified risk elements, the weight capable of being adjusted based on user feedback. Moreover, an overall risk is calculated for the at least one software testing project based on the identified risk elements and assigned weights.

12 Claims, 4 Drawing Sheets

SYSTEM, METHOD, AND COMPUTER PROGRAM FOR CALCULATING RISK ASSOCIATED WITH A SOFTWARE TESTING PROJECT

FIELD OF THE INVENTION

The present invention relates to software testing, and more particular to efficiently calculating risk associated with such software testing.

BACKGROUND

A testing project is a service provided by a testing professional organization to verify the quality of a software product before it is deployed to a live customer system. Such a testing project has multiple dependencies on definitions made by managers of the software delivery program, the product's core and external integration configuration, and different surrounding atmosphere attributes which may impact the project's progress or customer's ability to provide feedback to the testing team on the tests designed or issues detected.

One of the most important tasks a test manager planning his project must perform is an analysis of the dependencies in his project to perform calculation of the risks his project exposes. The ability to foresee the bottle necks and show stoppers in advance is necessity for a manager to be able to lead a project to high quality timely production deployment. Currently, there is not a system allowing the ability to efficiently foresee these issues.

There is thus a need for addressing these and/or other issues associated with the prior art.

SUMMARY

A system, method, and computer program product are provided for calculating risk associated with a software testing project. In use, a plurality of inputs associated with at least one software testing project are received. Additionally, risk elements are identified utilizing the plurality of inputs. Further, a weight is assigned to each of the identified risk elements, the weight capable of being adjusted based on user feedback. Moreover, an overall risk is calculated for the at least one software testing project based on the identified risk elements and assigned weights.

DETAILED DESCRIPTION

Figure 1:
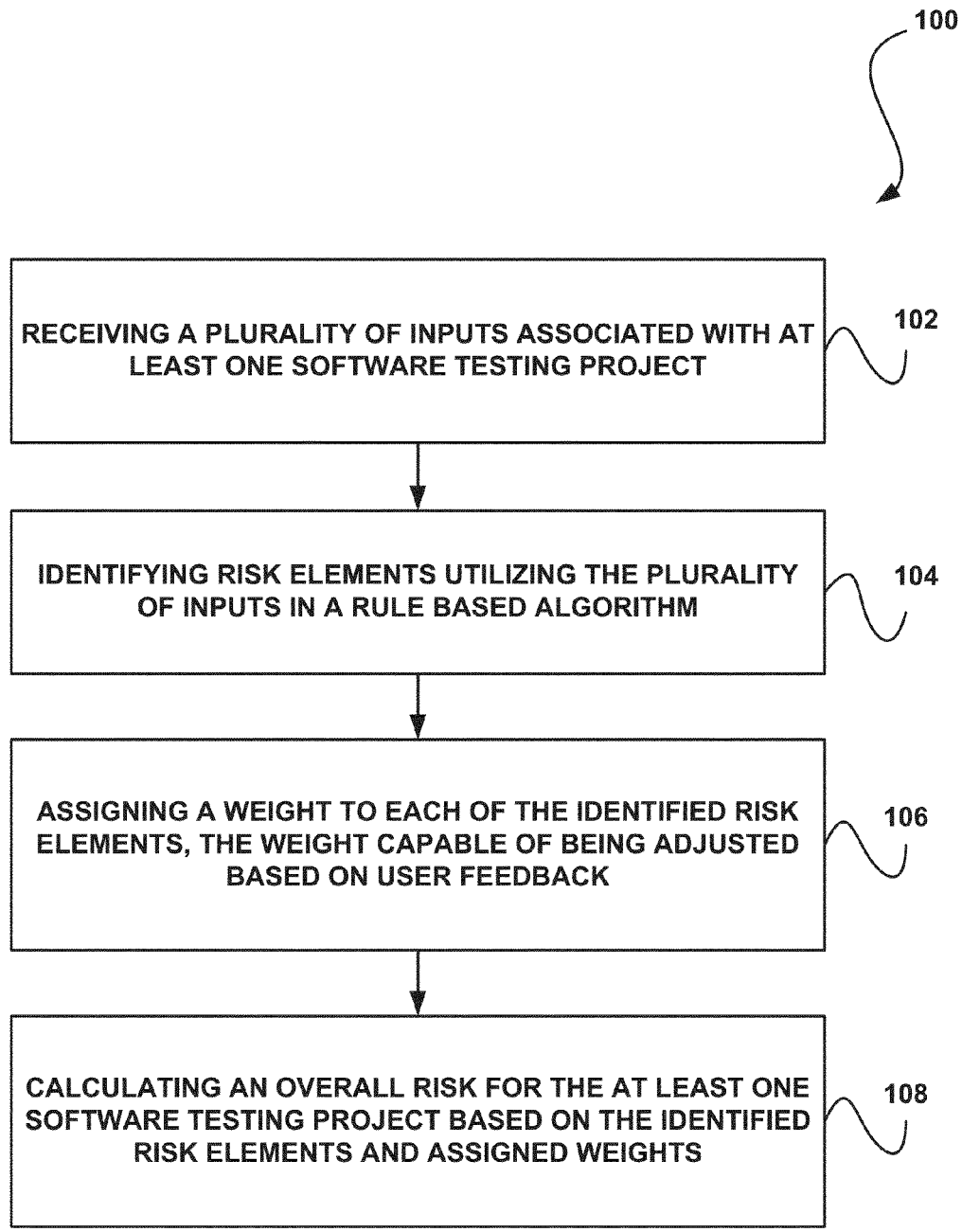
FIG. 1 illustrates a method for calculating risk associated with a software testing project, in accordance with one embodiment.

FIG. 1 illustrates a method 100 for calculating risk associated with a software testing project, in accordance with one embodiment.

As shown, a plurality of inputs associated with at least one software testing project are received. See operation 102. The software testing project may include any type of software testing project and may be a portion of a larger testing project or an entire project.

The inputs received may include a variety of inputs. For example, the inputs may include testing project characteristics associated with the software testing project. As another example, the inputs may include program configuration parameters associated with the software testing project. As another example, the inputs may include atmosphere attributes associated with the software testing project. Inputs may be provided at the beginning of the project or during the course of the project, thus adjusting the risk calculation according to current testing project state.

Of course, the inputs may include any combination of these inputs. For example, the inputs may include testing project characteristics associated with the software testing project, program configuration parameters associated with the software testing project, and atmosphere attributes associated with the software testing project.

Further, in one embodiment, the inputs may be received from user input to a user interface. In this case, the inputs may be received from user input to the user interface in response to a user interface request for the user to define project characteristics associated with the software testing project. The user interface request for the user to define the project characteristics may include a request for a plurality of non-mandatory attributes and/or mandatory attributes associated with the project.

With further reference to FIG. 1, risk elements are identified utilizing the plurality of inputs. See operation 104. The risk elements may be associated with any activity, process, step, and/or other component corresponding to the testing project. The algorithm may utilize a rules repository to associate risks which are relevant for the current software testing project characteristics. At this stage in the algorithm, each risk identified may be associated with an independent risk grade.

Further, a weight is assigned to each of the identified risk elements. See operation 106. The weight is capable of being adjusted based on user feedback (e.g. customer feedback, etc.). The weight may include any scaling that is utilized to weight a particular risk element based on various criteria, such as a determined risk level, etc. The output of this step of the algorithm can be an organized list of risk elements which the user follows to understand the most immediate and crucial risk elements of his at least one software testing project as defined by the verity of inputs collected. The algorithm adjusts the list as the project progresses based on changes in the variety of inputs which the system measures at ongoing basis.

Moreover, an overall risk is calculated for the at least one software testing project based on the identified risk elements and assigned weights. See operation 108. The overall risk may be indicated in various ways. For example, the overall risk may be indicated utilizing a level indicator such as "high", "low", etc., or utilizing a numerical level indicator such as on a 1-10 scale, etc.

In one embodiment, the method 100 may further include calculating a risk level for each of the identified risk elements. In this case, the risk level for each of the identified risk elements may be calculated based on a variety of factors.

For example, the risk level for each of the identified risk elements may be calculated based on an importance of an action associated with the risk element. As another example, the risk level for each of the identified risk elements may be calculated based on a level of impact of an action associated with the risk element. As another example, the risk level for each of the identified risk elements may be calculated based on a duration of time required to fix an issue corresponding to an action associated with the risk element.

Of course, any combination of these factors may be utilized to determine the risk level. For example, in one embodiment, the risk level for each of the identified risk elements may be calculated based on an importance of an action associated with the risk element, a level of impact of the action on the at least one software testing project, and a duration of time required to fix an issue corresponding to the action.

In any case, the risk level for each of the identified risk elements and the weight for each of the identified risk elements may be utilized to calculate the overall risk for the at least one software testing project. Further, in one embodiment, the risk level for each of the identified risk elements may be displayed/presented utilizing a user interface. As an option, the identified risk elements may be presented in an order from a risk element with a highest risk level to a risk element with a lowest risk level. In addition, a risk rank associated with each of the risk elements may be displayed.

Of course, in various embodiments, the user interface may present any type of information. For example, in one embodiment, the overall risk for the software testing project may be displayed utilizing the user interface. In an additional example, notifications can be set based on threshold of overall risk to allow sending alerts to the project manager and the higher organization management in case current project settings generate a risk above acceptable parameters.

Further, in one embodiment, mitigation options may be presented utilizing the user interface for lowering the risk level associated with the identified risk elements, thus lowering the overall risk of the project. The risk mitigation options may include previously implemented mitigation activities that proved to lower the risk associated with various activities. In one embodiment, a repository may store various mitigation options associated with testing projects. Upon selection of a mitigation option, a risk level associated with a risk element and/or the overall project risk may be recalculated.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
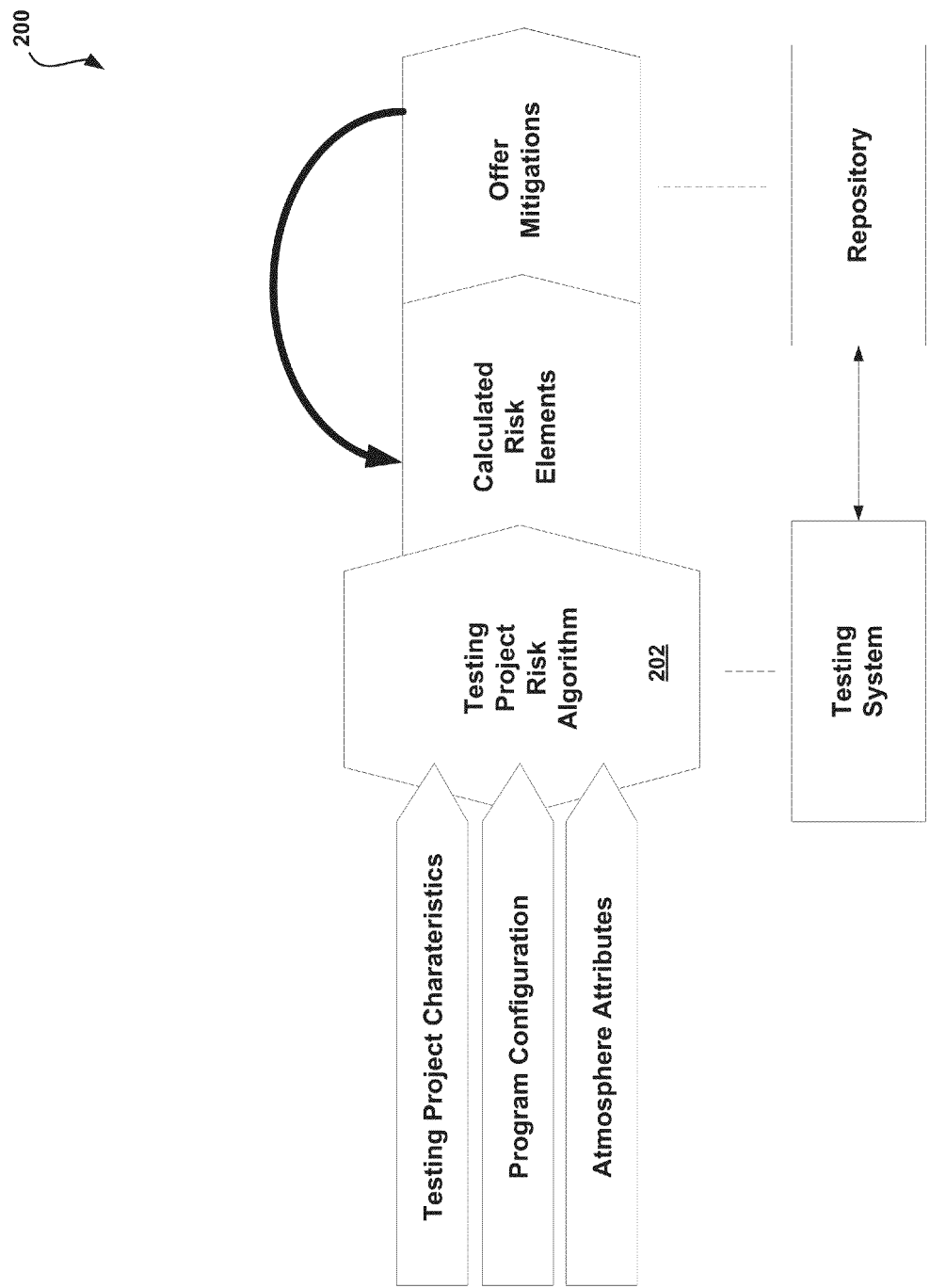
FIG. 2 illustrates a system flow for calculating risk associated with a software testing project, in accordance with one embodiment.

FIG. 2 illustrates a system flow 200 for calculating risk associated with a software testing project, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

In operation, a system associated with the system flow 200 may utilize a testing project risk algorithm 202 to calculate risk in testing projects based on multiple level conditions coming from a testing project's characteristics, the configuration of the program associated with the test, and even surrounding atmosphere attributes. The testing project risk algorithm 202 may provide both an overall risk level and the risk of elements identified.

The testing project risk algorithm 202 may include an automatic rules based algorithm such that a system may identify relevant risk elements associated with a project and assign a priority for each element, before presenting results to a customer. The system may also collect, and the algorithm 202 may utilize, customer feedback from which the system may learn.

In one embodiment, the system may utilize a structured lessons learned repository linked to the selected risk elements to offer proven mitigation steps for the specific risks identified. Risk evaluation and early mitigation steps are crucial capabilities in a testing project's road to success. The system may function to help projects steer away from critical show stoppers and avoid delay or unexpected high costs.

The system implementing the testing project risk algorithm 202 may be utilized to reduce production delay risks, reduce unexpected costs risks, increase customer confidence in its professional testing group as trusted partners, increase overall program efficiency, and to reuse relevant knowledge and best practice accumulated in the organization.

A testing project is a service provided by a testing professional organization to verify the quality of a software product before it is deployed to a live customer system. Such a testing project has multiple dependencies on definitions made by managers of the software delivery program, the product's core and external integration configuration, and different surrounding atmosphere attributes which may impact the project's progress or customer's ability to provide feedback to the testing team on the tests designed or issues detected.

One of the most important tasks a test manager planning his project must perform is an analysis of the dependencies in his project to perform calculation of the risks his project exposes. The ability to foresee the bottle necks and show stoppers in advance is must for a manager to be able to lead a project to high quality timely production deployment. The techniques described herein provide the manager a system to assist him in this task.

In operation, the system requests the user to define project characteristics (e.g. utilizing a user interface). At this stage, the system may allow a user (e.g. a manager, etc.) to populate any and all items the user knows which may or may not impact the project.

The system may request a large range of possible attributes, none of which may be mandatory. Therefore, the user will not need be limited to the items the user believes are important, but may provide information about every aspect of the project, so the system may perform the analysis and calculate the weight of each element of risk.

In one embodiment, the system may include a structured rule based automatic algorithm (e.g. the algorithm 202) to receive the inputs, assign weights, and balance the different project considerations impacting the project in order to identify any risk element relevant to the project. The algorithm may calculate the level of risk which each of the elements introduces to the project based on the importance of the action it impacts, the level of impact on that activity, and the duration of time it takes to fix issues in this activity. In addition, the system may calculate the overall project risk.

In one embodiment, a user (e.g. an administrator of the system, etc.) may generate the rules that define, for each risk element, at which project considerations it appears.

One example of a rule is a testing project with integration to system elements that have only a single testing resource that may carry a risk on the number of parallel tests the project can execute in end-to-end (E2E) and integration testing test types.

The user (e.g. the administrator, etc.) may assign an initial weight to each risk element based on the characteristics it fits, however, the system may also automatically adjust the weights based on feedback coming from users.

Mitigations selected by users may also be taken in consideration for the risk calculation, so every mitigation the user selects or identifies after receiving the initial risk evaluation will adjust the level of risk for that element and will also reflect in the overall risk. The target of algorithm is to help the user reduce the level of risk as much as possible by selecting as few as possible mitigation activities.

The algorithm may provide back to the user the overall risk calculated, the elements ordered from top risk element and down, with the risk rank associated to each element. This information may be presented utilizing a user interface.

The system allows the user (e.g. a customer, etc.) to provide feedback to the algorithm by permitting the customer to modify the risk evaluation of different elements and by adding additional elements the user considers as impacting the project (e.g. which the algorithm did not add). When adding additional elements, in one embodiment, the user may choose from a common repository of risk elements that are already analyzed and associated to the repository of mitigations. The user may choose to add risk elements to the repository, which may be monitored by administrators to ensure proper maintenance of the repository. Once added, the risk elements may be created as risk items with an assigned owner and due date for management, until closure.

At the next stage the system may perform a search for all relevant mitigation steps the customer must perform based on the risk elements and their priorities. In one embodiment, mitigations may be presented according the descending order of overall risk level they are able to reduce (e.g. the sum of risk reduced by the mitigation item from all related risk elements).

The user may select from the recommended mitigation items the various mitigation items to implement. Once selected, the system may log them as items linked to the risks, each with an assigned owner and due date to track until closure. Based on selection, the new overall risk level is calculated.

The system may track the selected mitigation and increase the mitigation's priority for selected items, so in future projects the selected mitigation will get a higher recommendation.

The mitigations offered to the user may be provided in an order which represents the top risk removal at the top of the list ordering the next items at a risk removal descending order.

Every mitigation selected may update the calculation of risk both for the impacted risk elements and for the overall risk. This allows the user to understand the impact of the mitigation selected and continue to select mitigations until the risk level is reduced to a reasonable level, both at an individual risk element level and at overall risk level.

The system is unique in its ability to calculate the risk elements which are unknown to the user, based on project characteristics which the user are aware of. In addition, the system is focused on the testing elements of the project.

Additionally, the system offers a link between risk elements repository and proven mitigation actions repository. The system capability of calculating the best mitigation actions for the project and the direct link to the management system allowing to track both risk and mitigation items are an advantage in not only calculating risk but helping to reduce it with a proven mitigation continually updated repository.

Further, the system offers the ability to constantly learn from its customer. Each recommendation the system presents is subjected to feedback, the feedback teaches the system which option it provided were accepted and which were rejected so in future recommendations the system could give an even higher accuracy recommendation.

Also, the system requires no big data because it utilizes an algorithm that uses rules maintained by experts to evaluate the risk level of projects on multiple parameters. This allows the organization to define benchmarks aiming to reduce risk level across all projects dramatically, even if current average is closer to a projects state.

As an example, based on multiple parameters a user may calculate the risk of failing to activate mobile in UAT day 1 is 80%. An investigation of data in all existing projects of the same type for the same product may show an 85% risk for the same activity.

Utilizing this system, information may be collected from the many experts in an organization who faced similar issues and the mitigations from their lessons learned. Using those mitigations, the system may calculate the true risk for the project for this activity should be 30% instead of 80%, if the mitigations are followed.

Being able to provide mitigations that are relevant for a project, based on its classifications, allows a user not only to analyze a project state but to give the user steps that will reduce the risk of failure according to what other users (e.g. managers, etc.) learned they should have done and not based on what they unfortunately did.

More information associated with mitigating risk for a software testing project may be found in U.S. patent application Ser. No. 14/550,869, filed Nov. 21, 2014, titled "SYSTEM, METHOD, AND COMPUTER PROGRAM FOR MITIGATING RISK ASSOCIATED WITH A SOFTWARE TESTING PROJECT," the entire contents of which are incorporated herein by reference.

Figure 3:
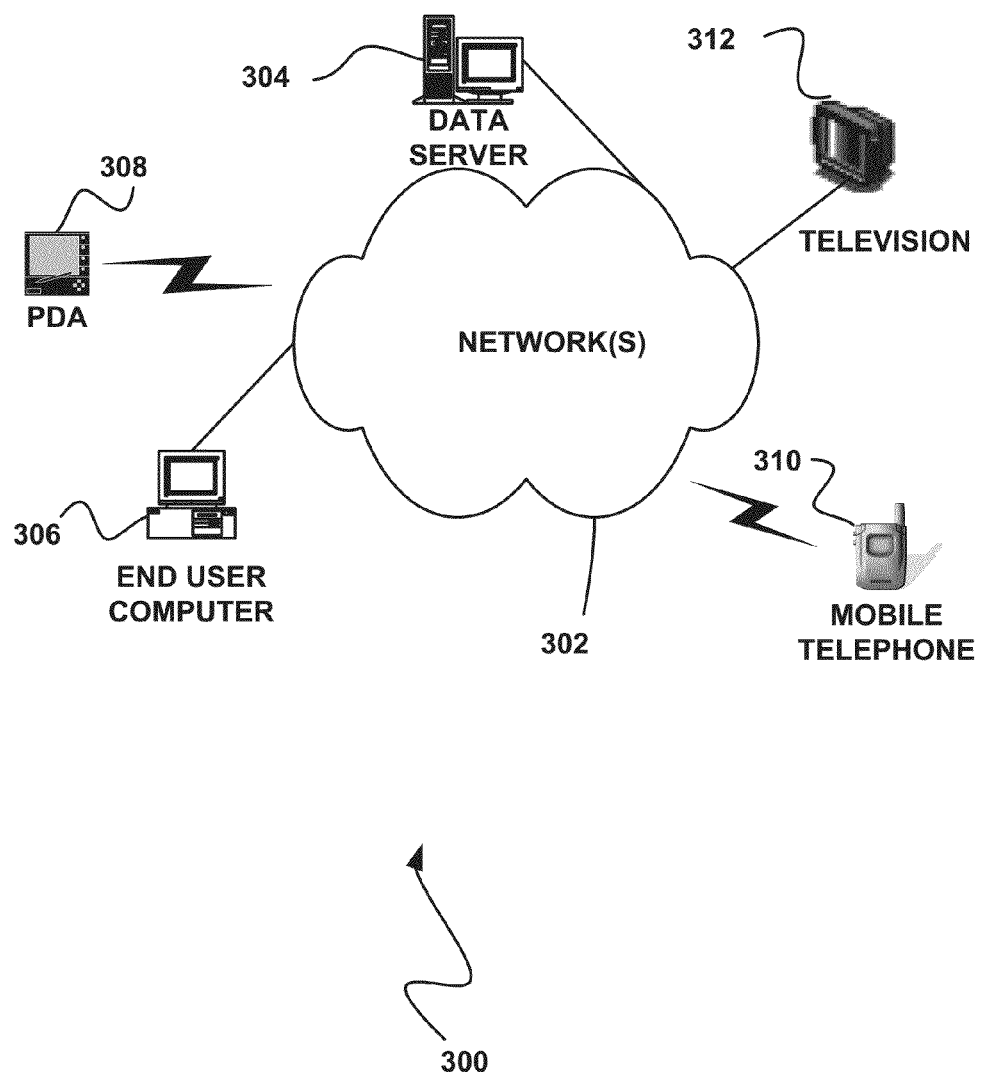
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
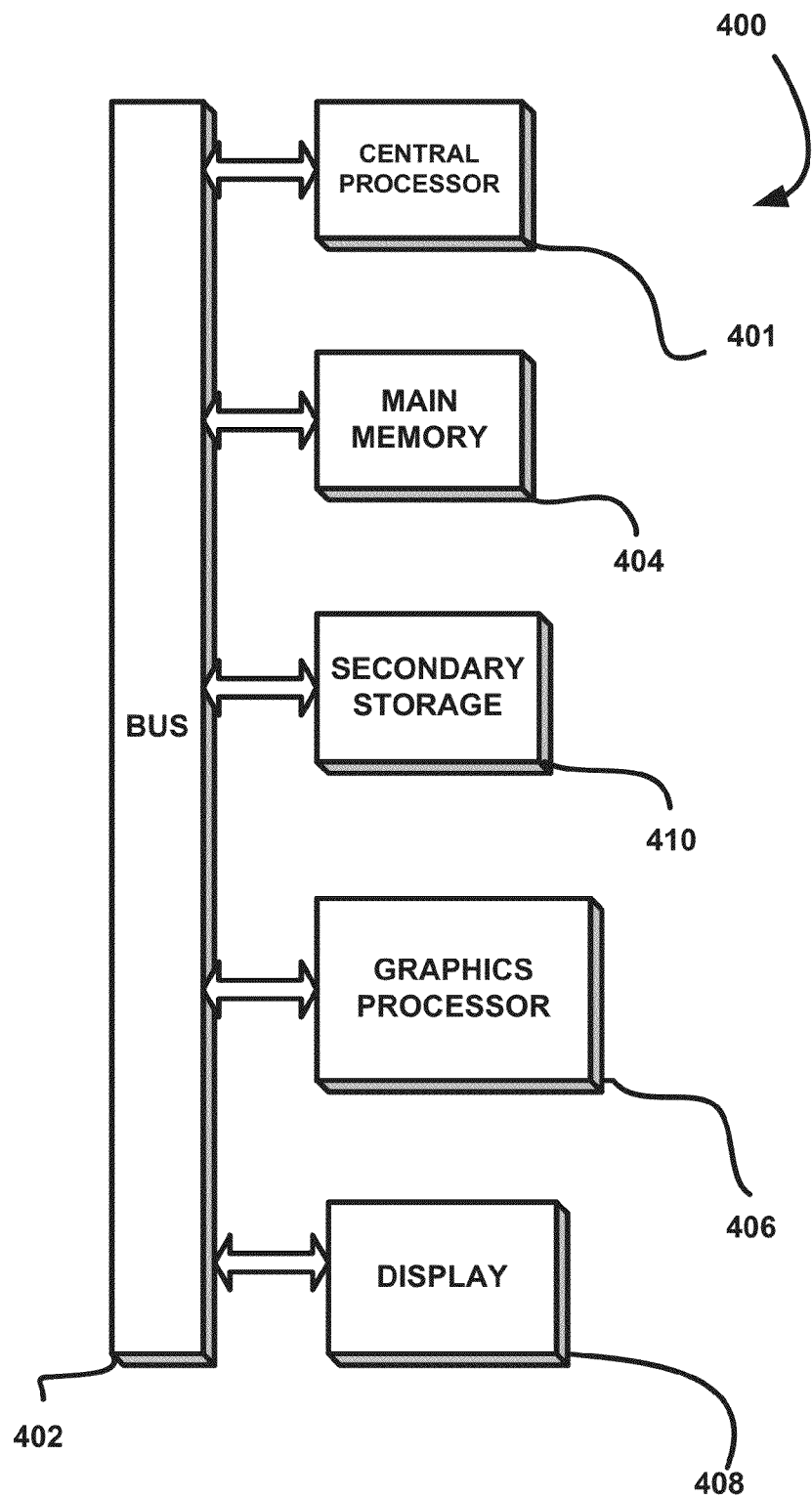
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   requesting that a user define a plurality of inputs associated with at least one software testing project;
   receiving from the user the plurality of inputs associated with the at least one software testing project, in response to the requesting;
   identifying risk elements utilizing the plurality of inputs;
   calculating a risk level for each of the identified risk elements, where the risk level is calculated based on an importance of an action associated with the risk element, a level of impact of the action on the at least one software testing project, and a duration of time required to fix an issue corresponding to the action;
   assigning a weight to each of the identified risk elements, the weight capable of being adjusted based on user feedback;
   calculating an overall risk for the at least one software testing project, utilizing the risk level for each of the identified risk elements and the weight for each of the identified risk elements;
   comparing the overall risk for the at least one software testing project to a defined threshold;
   and conditionally sending an alert notification, based on the comparing.

2. The computer program product of claim 1, wherein the computer program product is operable such that the plurality of inputs include testing project characteristics associated with the at least one software testing project.

3. The computer program product of claim 1, wherein the computer program product is operable such that the plurality of inputs include program configuration parameters associated with the at least one software testing project.

4. The computer program product of claim 1, wherein the computer program product is operable such that the plurality of inputs include atmosphere attributes associated with the at least one software testing project.

5. The computer program product of claim 1, wherein the computer program product is operable such that the plurality of inputs include testing project characteristics associated with the at least one software testing project, program configuration parameters associated with the at least one software testing project, and atmosphere attributes associated with the at least one software testing project.

6. The computer program product of claim 1, wherein the computer program product is operable such that the plurality of inputs are received from user input to a user interface.

7. The computer program product of claim 1, wherein the computer program product is operable such that the request for the user to define the project characteristics associated with the at least one software testing project includes a request for a plurality of non-mandatory attributes.

8. The computer program product of claim 1, further comprising computer code for presenting the risk level for each of the identified risk elements utilizing a user interface.

9. The computer program product of claim 8, wherein the computer program product is operable such that the identified risk elements are presented in an order from a risk element with a highest risk level to a risk element with a lowest risk level.

10. The computer program product of claim 9, further comprising computer code for presenting a plurality of mitigation options for lowering the risk level associated with the identified risk elements.

11. A method, comprising:
    requesting that a user define a plurality of inputs associated with at least one software testing project;
    receiving from the user the plurality of inputs associated with the at least one software testing project, in response to the requesting;
    identifying risk elements utilizing the plurality of inputs;
    calculating a risk level for each of the identified risk elements, where the risk level is calculated based on an importance of an action associated with the risk element, a level of impact of the action on the at least one software testing project, and a duration of time required to fix an issue corresponding to the action;
    assigning a weight to each of the identified risk elements, the weight capable of being adjusted based on user feedback;
    calculating an overall risk for the at least one software testing project, utilizing the risk level for each of the identified risk elements and the weight for each of the identified risk elements;
    comparing the overall risk for the at least one software testing project to a defined threshold;
    and conditionally sending an alert notification, based on the comparing.

12. A system comprising:
    a memory system;
    and one or more processing cores coupled to the memory system and that are each configured for:
    requesting that a user define a plurality of inputs associated with at least one software testing project;
    receiving from the user the plurality of inputs associated with the at least one software testing project, in response to the requesting;
    identifying risk elements utilizing the plurality of inputs;
    calculating a risk level for each of the identified risk elements, where the risk level is calculated based on an importance of an action associated with the risk element, a level of impact of the action on the at least one software testing project, and a duration of time required to fix an issue corresponding to the action;
    assigning a weight to each of the identified risk elements, the weight capable of being adjusted based on user feedback;
    calculating an overall risk for the at least one software testing project, utilizing the risk level for each of the identified risk elements and the weight for each of the identified risk elements;
    comparing the overall risk for the at least one software testing project to a defined threshold; and
    conditionally sending an alert notification, based on the comparing.

* * * * *